United States Patent
Subramanian et al.

(10) Patent No.: US 11,321,762 B2
(45) Date of Patent: May 3, 2022

(54) AUTOMATED HYBRID PROPENSITY DECISION VECTOR GENERATION USING ARTIFICIAL INTELLIGENCE

(71) Applicant: International Business Machines Corporation, Armonk, NY (US)

(72) Inventors: Shivaram Subramanian, Frisco, TX (US); Pavithra Harsha, White Plains, NY (US); Wei Sun, Tarrytown, NY (US); Markus Ettl, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/917,744

(22) Filed: Jun. 30, 2020

(65) Prior Publication Data

US 2021/0406978 A1     Dec. 30, 2021

(51) Int. Cl.
*G06Q 30/06* (2012.01)
*G06N 20/00* (2019.01)

(52) U.S. Cl.
CPC ......... *G06Q 30/0631* (2013.01); *G06N 20/00* (2019.01)

(58) Field of Classification Search
CPC ............................................... G06Q 30/06–08
See application file for complete search history.

(56) References Cited

U.S. PATENT DOCUMENTS

| | | |
|---|---|---|
| 9,727,616 B2 | 8/2017 | Wu |
| 10,366,362 B1 | 7/2019 | Reddy |
| 2008/0208678 A1* | 8/2008 | Walser .................. G06Q 10/06 705/7.31 |
| 2010/0241491 A1 | 9/2010 | Eglen |
| 2015/0100384 A1* | 4/2015 | Ettl .................... G06Q 30/0206 705/7.35 |
| 2018/0068329 A1 | 3/2018 | Ganti |

(Continued)

OTHER PUBLICATIONS

Google says machine learning is the future. So I tried it myself, Alex Hern Jun. 28, 2016 (Year: 2016).*

(Continued)

*Primary Examiner* — Ming Shui
(74) *Attorney, Agent, or Firm* — Michael A. Petrocelli (57) ABSTRACT

A computer generates an optimized decision distribution vector for a plurality of related, demand-correlated products. The computer receives data indexed by product, with each entry including several entry attributes. The computer receives decision context data for the products. The computer determines a set of primary attributes and trains a first machine learning model based upon those attributes. The computer receives a decision optimization request that includes an associated set of attributes corresponding to the primary attributes. The computer scores the associated set of attributes, using the first machine learning model, to generate a baseline purchase propensity. The computer trains a second machine learning model, based upon the baseline purchase propensity and the decision context data, to generate own-product and cross-product elasticity data. The computer, using the own-product and cross-product elasticity data, generates a decision distribution vector for the group of related, demand-correlated products.

14 Claims, 6 Drawing Sheets

(56) References Cited

U.S. PATENT DOCUMENTS

2019/0244230 A1  8/2019  Subramanian
2020/0043027 A1  2/2020  Bhasin

OTHER PUBLICATIONS

Recommended For You: How machine learning helps you choose what to consume next, Jennifer Wei, Aug. 28, 2017 (Year: 2017).*
Machine Learning: What it is and why it matters, SAS, Jan. 7, 2014. (Year: 2014).*
Sequence Models and Recurrent Neural Networks, Santhoopa Jayawardhana.*
Parametric and Nonparametric Machine Learning Algorithms, Jason Brownlee.*
Machine Learning FAQ.*
"Powering Individualization For Travelers, Suppliers and Travel Agents", © 2020 Deepair Solutions, 4 pages, <https://www.deepair.io/>.
Aouad, et al., "Market Segmentation Trees", arXiv: 1906.01174v2, [stat.AP], Jan. 15, 2020, 40 pages, <https://arxiv.org/pdf/1906.01174.pdf>.
Mell et al., "The NIST Definition of Cloud Computing", National Institute of Standards and Technology, Special Publication 800-145, Sep. 2011, 7 pages.
Shikla, et al., "Dynamic Pricing for Airline Ancillaries with Customer Context", arXiv:1902.02236v1, [stat.ML], Feb. 6, 2019, 9 pages, <https://arxiv.org/pdf/1902.02236.pdf>.

* cited by examiner

AUTOMATED HYBRID PROPENSITY DECISION VECTOR GENERATION USING ARTIFICIAL INTELLIGENCE

BACKGROUND

The present invention relates generally to the field of artificial intelligence, and more specifically, to artificial intelligence used in generating decision distribution vectors for a plurality of products having correlated demands.

Automated pricing systems can use machine learning to recommend decision distribution vectors for different categories of related, demand-correlated products, such as tickets for seats in various sections of an airplane (e.g., economy, economy plus, business, first class, etc.). Although some of these systems may excel at accuracy or provide high-speed returns, it can be difficult for a system to provide accurate and speedy results, in environments with large variation in purchasing scenarios for related, demand-correlated products. When there is correlation, a customer looks at the prices of all choices and then decides, with the price of any one item influencing the purchase probability of all items. This non-separability hurts deep learning models in terms of speed and customer response representation (pricing effectiveness), and it also hurts traditional linear models in terms of prediction accuracy.

Deep learning and recurrent neural networks, for example are able to identify hidden patterns in data and can provide accurate predictions for behavior in some scenarios. This accuracy comes at a cost, however, and these models require extensive training with large training data sets, and they are not suitable for situations that require result interpretability, such as highly regulated industries, like air travel. Parametric, or linear models can be nimble, providing reactivity to changing product availability and often generate results that are interpretable and suitable for regulated industries. Unfortunately, these models often trade speed for accuracy and may not provide results that are suitable for industries that provide a variety of related products, with a complicated set of product attributes and governing regulations, like airline seat upgrades and service bundles.

Limitations with known pricing systems prevent them from providing nimble pricing distribution vectors for an industry, such as airline ticket sales, that must accurately and quickly accommodate large volumes of near-simultaneous requests for seat purchases at prices that will maximize allowable revenue for the selling airline, while providing seat package options that meet traveler needs. Typically, accuracy regarding best prices comes with speed and interpretability penalties, and systems with increased speed often suffer from decreased accuracy.

SUMMARY

According to an embodiment, the present invention includes a computer-implemented method for automatically generating an optimized decision distribution vector for a group of related, demand-correlated products. The method includes receiving, by the computer, a data set with entries indexed according to product, with each entry including a set of entry attributes. The computer receives decision context data for the group of products, and the decision context data can include information such as price data, inventory data, promotion campaign data, and advertisement data. The computer determines a set of primary attributes from among the group of entry attributes and trains a first machine learning model based upon the set of primary attributes. The computer, in response to receiving a decision request with an associated set of attributes that correspond to the set of primary attributes, scores the set of attributes with the first machine learning model to generate a baseline purchase propensity. The computer trains a second machine learning model based upon the baseline purchase propensity and decision context data, to generate own-product elasticity data and cross-product elasticity data. The computer uses the own-product elasticity data and cross-product elasticity data to generate a decision distribution vector for the group of related, demand-correlated products.

According to some aspects of the invention, the determination of the set of primary attributes includes training by the computer of the second machine learning model, based incrementally upon the entry attributes to generate, incrementally modified price elasticity. The computer determines a pricing effectiveness value associated with each of the entry attributes for each of the associated incrementally modified price elasticities. The computer ranks the entry attributes by pricing effectiveness value and iteratively adds each of the entry attributes in decreasing pricing effectiveness rank order to a set of secondary attributes used with the second machine learning model to calculate the decision distribution vector, until an own-product elasticity data and cross-product elasticity data value computation duration exceeds a selected computation duration threshold. The computer labels each remaining entry attribute as a primary entry attribute and removes each of the entry attributes added to the secondary entry attributes from the set of primary attributes.

According to some aspects of the invention the pricing effectiveness is chosen by considering predicted revenue error and revenue lift.

According to some aspects of the invention the selected computation duration threshold is 10 milliseconds.

According to some aspects of the invention the decision context data further includes available inventory and origin-destination data.

According to some aspects of the invention the entry attributes are selected from among customer contexts, including demographics, loyalty, frequency/recency, and preferences; purchase contexts, including time of day, day of week, booking group size, advance purchase aspects; market contexts, including location features, market type, destination; and product contexts, including quality aspects, stayover restrictions.

According to some aspects of the invention the first machine learning model is a recurrent neural network.

According to some aspects of the invention the second machine learning model is a parametric model.

According to an embodiment, the present invention includes a system to automatically generate an optimized decision distribution vector for a plurality of related, demand-correlated products, which comprises: a computer system comprising a computer readable storage medium having program instructions embodied therewith, the program instructions executable by the computer to cause the computer to: receive a data set having a plurality of demand-correlated entries indexed according to said plurality of related, demand-correlated products, with each entry including a plurality of entry attributes; receive decision context data for said plurality of products, said decision context data selected from a list consisting of price data, inventory data, promotion campaign data, and advertisement data; determine a set of primary attributes from among said plurality of entry attributes; train a first machine learning model based upon said set of primary attributes; responsive to said computer receiving a decision request including a set of attributes that includes an associated set of attributes corresponding to said set of primary attributes, score said associated set of attributes corresponding to said set of primary attributes with said first machine learning model to generate a baseline purchase propensity; responsive to generating said baseline purchase propensity, train a second machine learning model based upon said baseline purchase propensity and said decision context data, to generate own-product elasticity data and cross-product elasticity data; and generate, using said own-product and cross-product elasticity data, a decision distribution vector for said plurality of related, demand-correlated products.

According to an embodiment, the present invention includes a computer program product to automatically generate an optimized decision distribution vector for a plurality of related, demand-correlated products, the computer program product comprising a computer readable storage medium having program instructions embodied therewith, the program instructions executable by the computer to cause the computer to: receive, using the computer, a data set having a plurality of entries indexed according to said plurality of related, demand-correlated products, with each entry including a plurality of entry attributes; receive, using the computer, decision context data for said plurality of products, said decision context data selected from a list consisting of price data, inventory data, promotion campaign data, and advertisement data; determine, using the computer, a set of primary attributes from among said plurality of entry attributes; train, using the computer, a first machine learning model based upon said set of primary attributes; responsive to said computer receiving a decision request including a set of attributes that includes an associated set of attributes corresponding to said set of primary attributes, score using the computer, said associated set of attributes corresponding to said set of primary attributes with said first machine learning model to generate a baseline purchase propensity; responsive to generating said baseline purchase propensity, train, using the computer, a second machine learning model based upon said baseline purchase propensity and said decision context data, to generate own-product elasticity data and cross-product elasticity data; and generate, using said computer and said own-product elasticity data and cross-product elasticity data, a decision distribution vector for said plurality of related, demand-correlated products.

The present disclosure recognizes the shortcomings and problems associated with learning and prediction models in current price generation systems, especially those used in real-time, airline-centric ticket sale environments. Embodiments of the invention provide price calculations that are fast and interpretable, without sacrificing accuracy. The present invention includes aspects that provide increased overall algorithmic efficiency, and which can accommodate rapidly changing product inventories. Other aspects of the invention can identify prices that preserve premium choice for loyal or high-value customers.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are set forth as below as.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a participant" includes reference to one or more of such participants unless the context clearly dictates otherwise.

Figure 1:
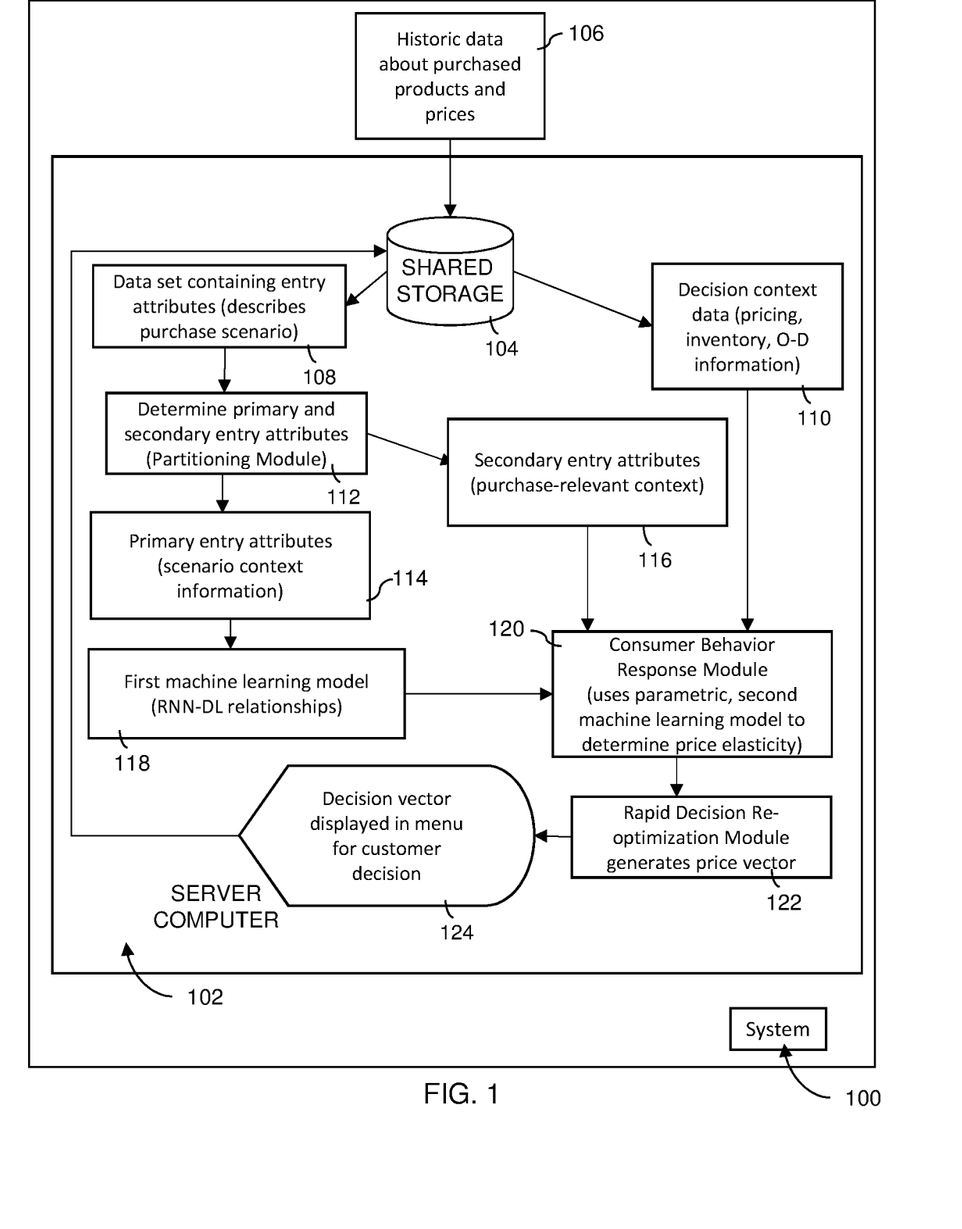
FIG. 1 is a schematic block diagram illustrating an overview of a system for computer-implemented, automated hybrid pricing vector generation according to embodiments of the present invention.
Figure 2:
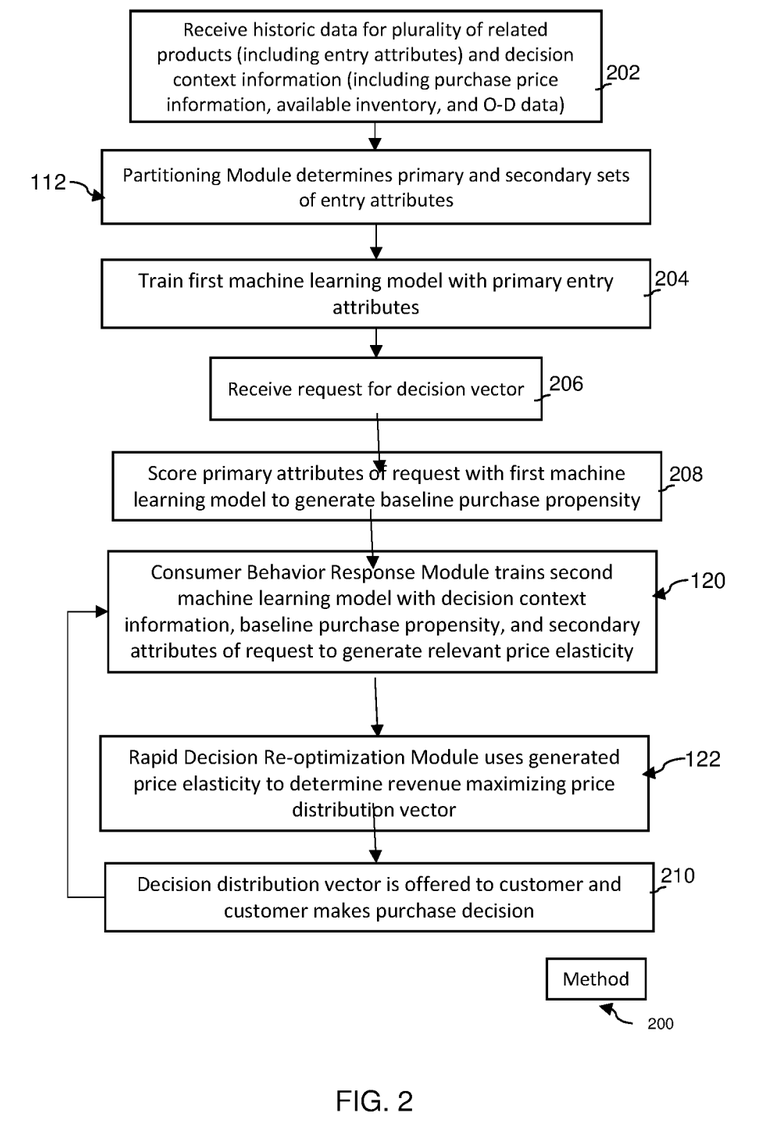
FIG. 2 is a flowchart illustrating a method using the system shown in FIG. 1, for computer-implemented, automated hybrid pricing vector generation.

Now with combined reference to the figures generally and with particular reference to FIG. 1 and FIG. 2, an overview of a method 200 for computer-implemented, automated hybrid pricing vector generation usable within a system 100 as carried out by a server computer 102 having optionally shared storage 104 and aspects that optimize revenue generation, accuracy, and speed, according to an embodiment of the present disclosure is shown.

According to aspects of the present invention, historic, customer-identity-independent data 106 about products sold and associated sale prices is provided to the shared storage 104. As will be explained in more detail below, the historic data may include a data set 108 that includes a large quantity of product entry attributes (e.g., information that describes various product purchase scenarios) and also decision context data (e.g., information about the ticket sale, itself).

The system 100 includes a Partitioning Module 112 with which the server computer 102 determines primary 114 and secondary 116 entry attributes from within the historic data. The server computer 102 uses primary and secondary entry attributes 114, 116, respectively, in a first machine learning model 118 and in a second machine learning model found in the Customer Behavior Response Module (hereafter, the "CBRM") 120. The server computer 102 collects decision context data 110 from the historic data 106 and passes it along to the CBRM 120.

The CBRM 120 includes a parametric, second learning model that uses prediction output from the first machine learning model 118, decision context data 110, and secondary entry attributes 116 to determine price elasticity, indicating customer sensitivity to own and cross product price variations. Once the server computer 102 determines own-product elasticity data and cross-product elasticity data values at block 120, it is passed along to the Rapid Price Re-optimization Module 122 (hereafter, the "RPRM") to generate a revenue maximizing decision distribution vector. According to one aspect of the invention, the price distribution is provided the via a customer display menu 124, so that a customer may consider her purchase options and make a selection. In some aspects of the invention, the results of the customer selecting from the price menu 124 are returned to the shared storage 104 and used to enrich the data set for further training if desired.

Now with particular reference to FIG. 2, the computerized method 200 for computer-implemented, automated hybrid pricing vector generation will be described. At block 202, historic 106 data showing various purchase scenarios for a variety of related, demand-correlated products (e.g., tickets at various locations within a plane bought at certain times, etc. According to aspects of this invention, the captured scenarios are represented by data in various contexts (e.g., customer contexts, including demographics, loyalty, frequency/recency, and preferences; purchase contexts, including time of day, day of week, booking group size, advance purchase aspects; market contexts, including location features, market type, destination; and product contexts, including quality aspects, stayover restrictions). Considerations for the decision distribution vector that is being optimized and generated as output are not limited to pricing decisions alone and can include: determining the most profitable inventory levels for each product, the best promotional discounts to offer (e.g., Buy 1 get 1 free) for each product, or most suitable advertising level for each product (e.g., which page of a store circular or ecommerce website location to display a particular product). Each of these decisions affect the customer propensity to purchase any of the offered products due to their correlated demands. Patterns in this data are difficult to determine manually, but RNN and deep learning (e.g., black box) models, such as the first machine learning model 118 are very capable of finding hidden patterns. The output results are not structured, and do not provide identifiability, but they are accurate when RNN/DL or blackbox models are trained with sufficient historic data, as is provided according to aspects of the present invention.

The historic data 106 may also include decision context data that provides information about the purchase, itself (e.g., price vector offered at decision time, inventory available, and Origin-Destination ("OD") data). This kind of data does not typically contain hidden patterns, but is easy to process, and training parametric or linear models (like the second machine learning model in the CBRM 120) on this kind of data can be done with very little delay, as long as computational limits are observed. As will be described below, to ensure speedy processing, care should be taken to ensure that computation duration thresholds are not exceeded by including too many variables in this kind of model. Aspects of this invention are provided to ensure such thresholds are observed.

The server computer 102 uses the Partitioning Module 112 to determine primary and secondary sets of entry attributes from among the historic data provided. The server computer 102, at block 204 uses the primary entry attributes 114 to train the first machine learning model 118. As noted above, the first machine learning model 118 is an RNN/DL model, and given the amount of time it takes to train this kind of model, first machine learning model of the present invention is typically trained overnight or some other relatively-slow purchase time and may only be trained once a week or so. The time and frequency of training may be adjusted according to the judgment of one skilled in this art. The server computer 102 conducts training at block 204 for the first machine learning model 118 based on primary entry attributes from within historic data provided. Training of machine learning models according to aspects of this invention are trained in the typical fashion used by those familiar with machine learning data processing models.

The server computer 102 receives, at block 206, a request for a pricing vector. The request includes scenario information including entry attributes, and the server computer 102 scores this data with the first machine learning model 118 at block 208. The output of scoring the request entry attributes is a baseline purchase propensity for the current request. This propensity indicates the likelihood (represented by percentage of likelihood for choosing a certain product—when price data is not considered) that the present customer (as described by situational attributes) will make certain purchasing choices. Although this propensity does not consider price, it is a very good indicator of how a current customer will act by identifying hidden purchasing trends that are present, when large amounts of historical data are used in model training.

The server computer 102 passes the baseline purchase propensity to the CBRM at block 120, and the baseline propensity is combined with decision context data and secondary event attributes (if present) to generate price elasticity, which indicates a customer sensitivity to prices (e.g., own and cross product effects). The server computer 102, in the RPRM at block 122 uses the generated own-product elasticity data and cross-product elasticity data values to determine a revenue maximizing decision distribution vector.

This distribution vector includes prices for each of the options a customer may choose to meet travel criteria included in the current request, and the prices are determined by the server computer 102, when complex multi-year scenario entry attributes from the historical data 106 are used to provide historically-accurate baseline propensities as input into the CBRM 120. The server computer 102, in the CBRM uses secondary event attributes, along with the baseline propensities and decision context data (like pricing assigned to various products purchased) to determine relevant price elasticity.

In this way the server computer 102 benefits from access to hidden and slow-to-change historical trends provided as highly-accurate seed information for further use in the nimble RPRM 122. This combination provides a hybrid approach that makes use of historical data trends in an RNN/DL first machine learning model that can be trained when offline or periodically, at non-peak times (because they do not change quickly) along with rapidly-changing, current decision context data (e.g., pricing, inventory availability, and secondary event attributes as determined in the Partitioning Module 112, described below) in a parametric, second machine learning model.

Once determined, the pricing distribution vector is passed along the customer at block 210, and the customer makes a purchase decision. It is noted that the customer decision (and the associated entry attributes) may be passed along the CBRM to provide additional training data for ever-increasing pricing elasticity calculation accuracy.

Figure 3:
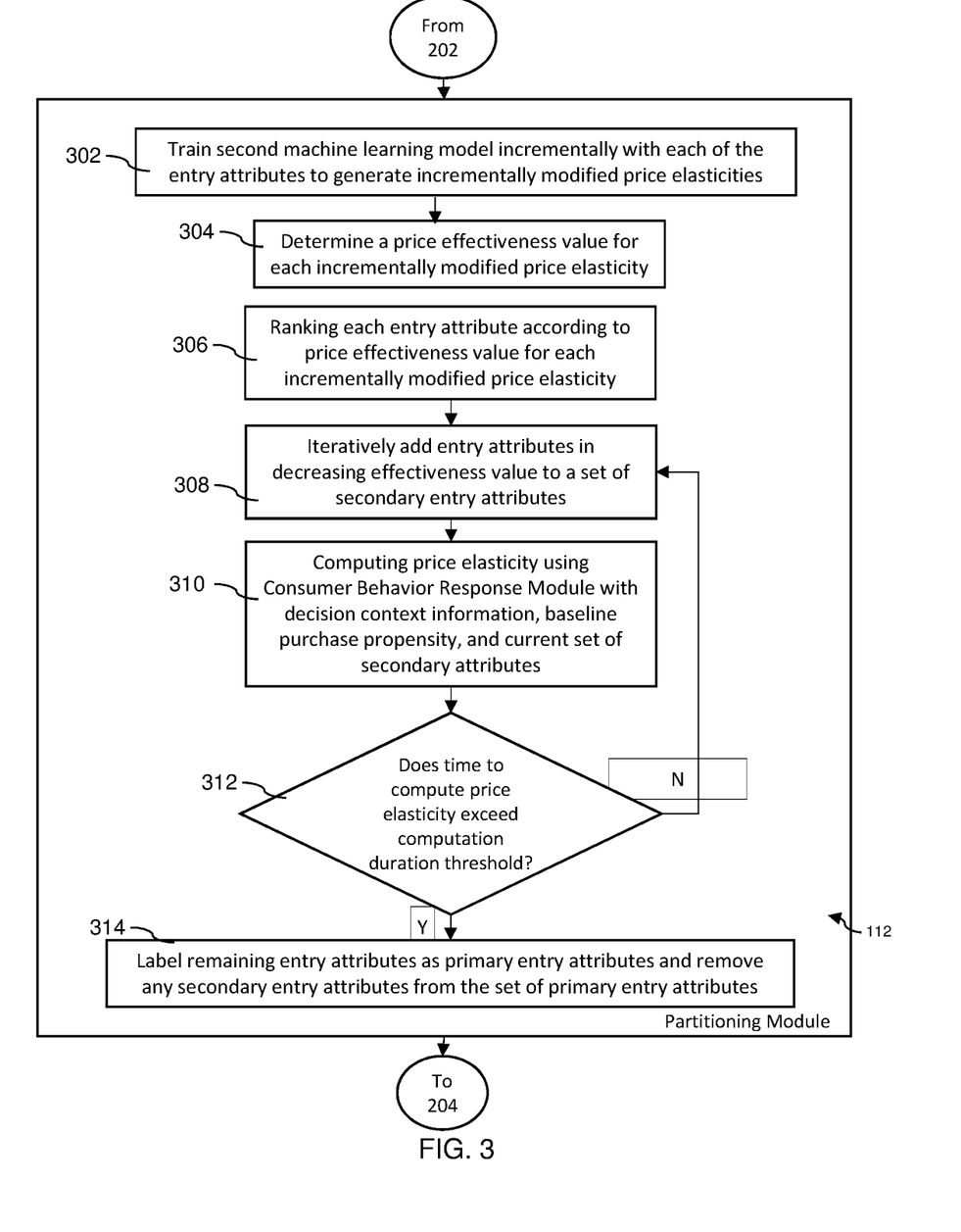
FIG. 3 is a flowchart illustrating aspects of a Partitioning Module shown from the system shown in FIG. 1.

With particular reference to FIG. 3, the Partitioning Module (hereafter, the "PM") 112 will now be described. The PM 112 ensures that primary and secondary entry attributes are used in an effective manner. That is, the PM ensures that hidden trends and vigorously-trained results are provided as baseline propensity output is generated by the first machine learning model 118, while simultaneously ensuring that own-product elasticity data and cross-product elasticity data values are determined in a nimble, current, and accurate manner as output from the CBRM. This is accomplished with the iterative approach shown in FIG. 3. In particular, the server computer 102 at blocks 302 scores each of the entry attributes 108, in the second machine learning model to determine incrementally-modified price elasticities for all of the entry attributes. The server computer 102, at block 304 determines an associated price effectiveness value for each entry attributes. It is noted that a variety of standards for effectiveness may be used, in accordance with the judgment of one skilled in this art. According to aspects of the present invention, the server computer 102 will, at block 304, determine effectiveness values of each entry attribute in accordance with predicted revenue error and expected incremental price lift scores compared to historical data. The server computer 102 will, at block 306 rank each entry attribute in accordance with associated effectiveness value. At block 308, the server computer will add, entry attributes in decreasing effectiveness value to a set of secondary entry attributes used in the CBRM. With each entry attribute added as a secondary attribute to the CBRM calculations, own-product elasticity data and cross-product elasticity data value computation duration is measured, and if, as determined by the server computer 102, at block 312, the own-product elasticity and cross-product elasticity data value computation duration exceeds a threshold, it is determined that the CBRM is saturated with parameters and no more entry attributes are added. It is noted that various own-product elasticity data and cross-product elasticity data value computation durations may suffice, based on a volume of customer pricing demand, as determined by one skilled in this art. According to aspects of the present invention, a suitable own-product elasticity and cross-product elasticity data computation duration threshold is a duration less than 10 milliseconds for own-product elasticity data and cross-product elasticity data computation. If this duration is not exceeded, then the logic flow of the server computer 102 returns to block 308, and the entry attribute with the next-highest ranked effectiveness is added to the list of secondary attributes. When secondary attribute assignment iteration ends, the server computer 102, at block 314 labels any remaining entry attributes as primary entry attributes and remove any secondary entry attributes from the set of primary entry attributes.

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
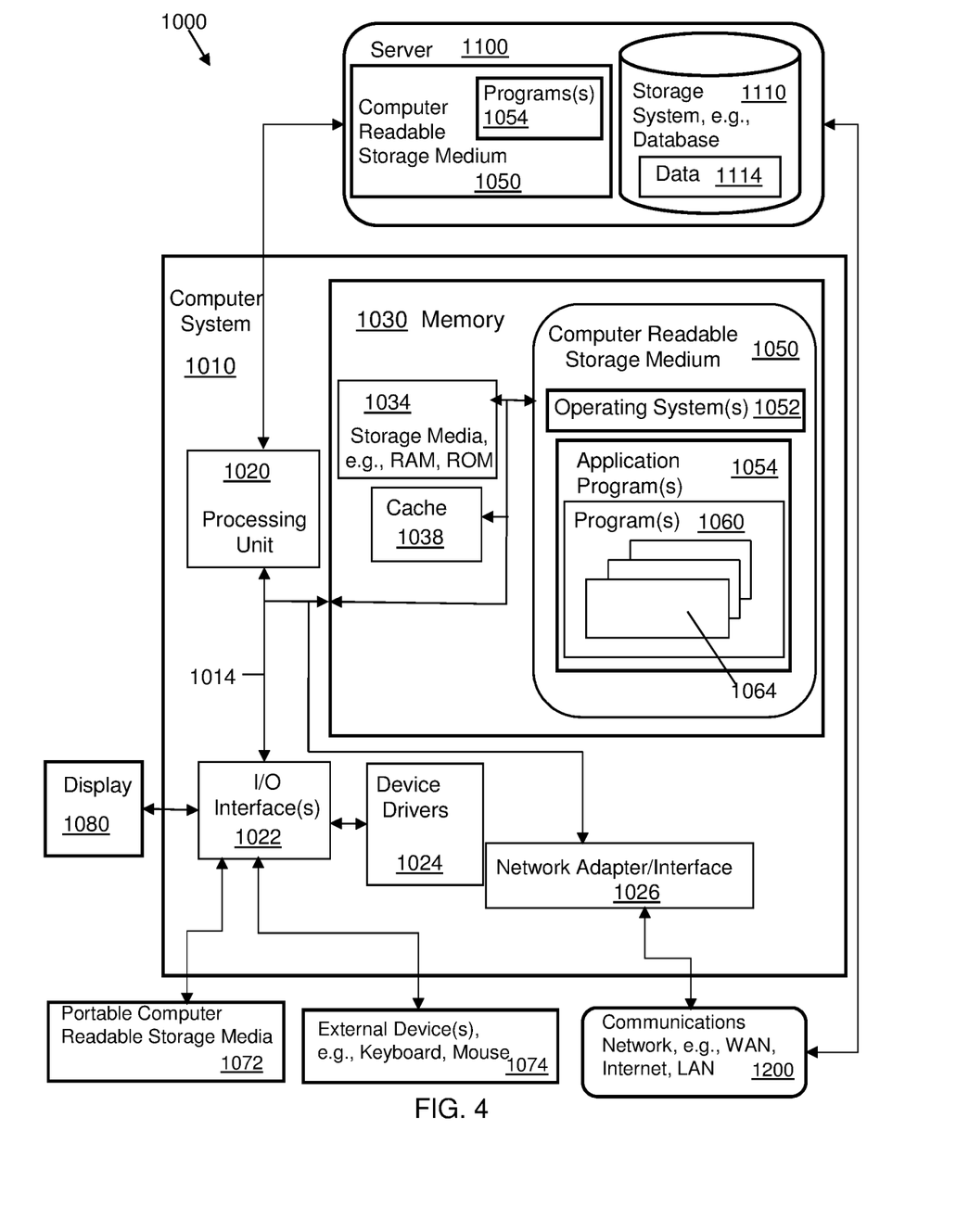
FIG. 4 is a schematic block diagram depicting a computer system according to an embodiment of the disclosure which may be incorporated, all or in part, in one or more computers or devices shown in FIG. 1, and cooperates with the systems and methods shown in FIG. 1.

Referring to FIG. 4, a system or computer environment 1000 includes a computer diagram 1010 shown in the form of a generic computing device. The method 100, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that the control system 70 (shown in FIG. 8) can include all or part of the computer system 1010 and its components, and/or the control system can communicate with all or part of the computer system 1010 and its components as a remote computer system, to achieve the control system functions described in the present disclosure. It is also understood that the one or more communication devices 110 shown in FIG. 1 similarly can include all or part of the computer system 1010 and its components, and/or the communication devices can communicate with all or part of the computer system 1010 and its components as a remote computer system, to achieve the computer functions described in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
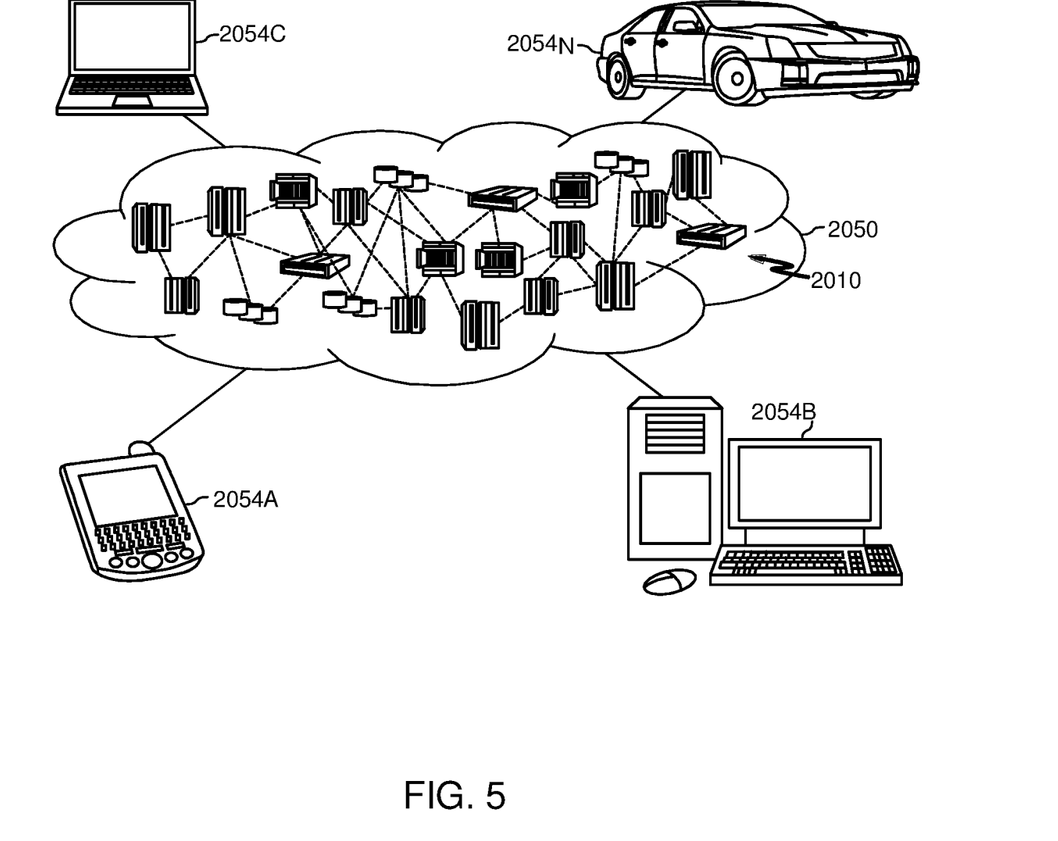
FIG. 5 depicts a cloud computing environment according to an embodiment of the present invention.

Referring now to FIG. 5, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 9 are intended to be illustrative only and that computing nodes 2010 and cloud computing environment 2050 can communicate with any type of computerized device over any type of network and/or network addressable connection (e.g., using a web browser).

Figure 6:
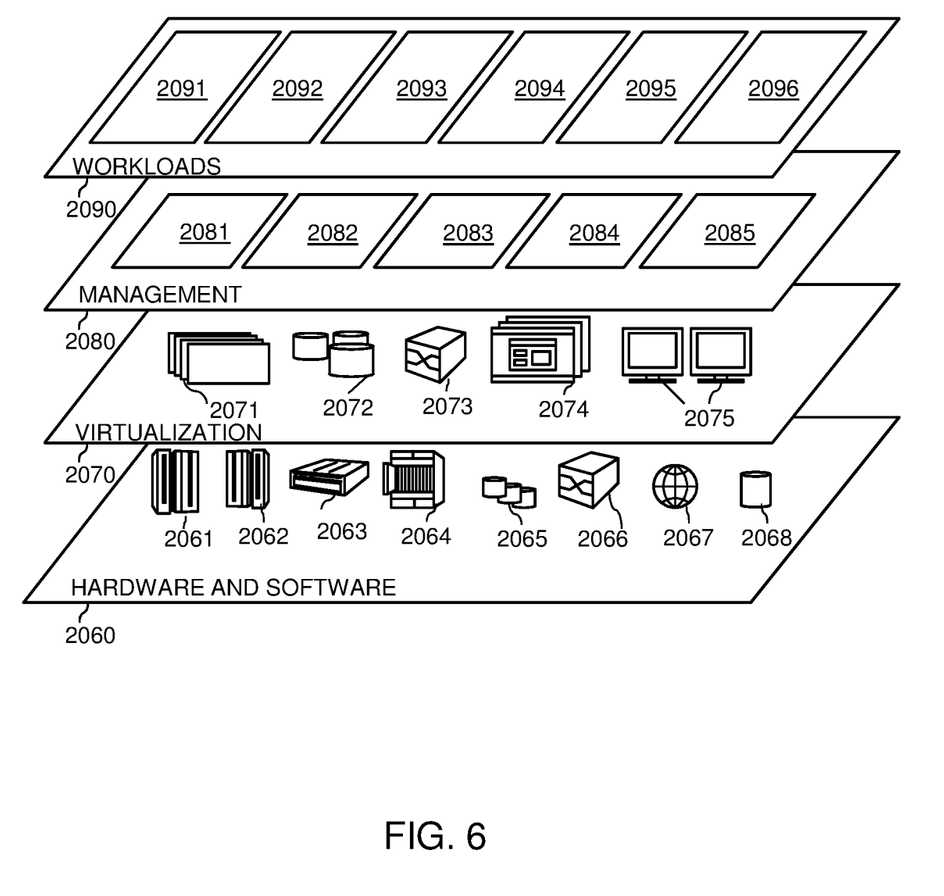
FIG. 6 depicts abstraction model layers according to an embodiment of the present invention.

Referring now to FIG. 6, a set of functional abstraction layers provided by cloud computing environment 2050 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and computer implemented, price vector generation to maximize revenue for a plurality of products 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method to automatically generate an optimized decision distribution vector for a plurality of related, demand-correlated products, comprising:

receiving, by said computer, a data set having a plurality of entries indexed according to said plurality of related, demand-correlated products, with each entry including a plurality of entry attributes;

receiving, by said computer, current decision context data for said plurality of products, said current decision context data selected from a list consisting of price data, inventory data, promotion campaign data, and advertisement data;

determining, by said computer, a set of primary entry attributes from among said plurality of entry attributes;

training, by said computer, a first machine learning model based upon said set of primary entry attributes offline or during non-peak times;

responsive to said computer receiving a decision request including a set of attributes that includes an associated set of attributes corresponding to said set of primary entry attributes, scoring by said computer, said associated set of attributes corresponding to said set of primary entry attributes with said first machine learning model to generate, by said computer, a baseline purchase propensity; to determine incrementally modified price elasticities for the plurality of entry attributes using the baseline purchase propensity;

training, by said computer, a second machine learning model, based incrementally upon each of said entry attributes to generate, by said computer, incrementally modified own-product elasticity data and cross-product elasticity data associated therewith;

determining, by said computer, a pricing effectiveness value associated with each of said entry attributes for each of said associated incrementally modified price elasticities;

ranking, by said computer, said entry attributes by said calculated pricing effectiveness value;

iteratively adding, by said computer, each of said entry attributes in decreasing pricing effectiveness rank order to a set of secondary entry attributes used with said second machine learning model to calculate said decision distribution vector, until an own-product elasticity data and cross-product elasticity data computation duration exceeds a selected computation duration threshold, labeling, by said computer, each remaining entry attribute as a primary entry attribute and removing each of said entry attributes added to said secondary entry attributes from said set of primary entry attributes;

responsive to generating said baseline purchase propensity, training by said computer, the second machine learning model based upon said baseline purchase propensity and said current decision context data, to generate own- and cross-product elasticity data with respect to the current decision context data, the baseline propensity being combined with the current decision context data and the secondary event attributes to generate the own-and cross-product elasticity data which indicates a customer sensitivity to prices, the current decision context data including pricing assigned to various products purchased;

generating, by said computer, using said own- and cross-product elasticity data, a decision distribution vector selected, at least in part, in accordance with said current decision context data for said plurality of related, demand-correlated products, the distribution vector including prices for each of the options a customer chooses to meet travel criteria included in the decision request;

providing, by said computer via a customer display menu in operative communication with said computer, a set of purchase choices representing a price distribution based, at least in part, on the distribution vector;

responsive to providing the set of purchase choices, receiving by the computer, an indication of user selection; and responsive to receiving the indication of user selection, adding metadata associated with the user selection for use in updated training of the first and second machine learning models.

2. The computer implemented method of claim 1, wherein said pricing effectiveness is based upon considerations selected from a list consisting of predicted revenue error and revenue lift.

3. The computer implemented method of claim 1, wherein said selected computation duration threshold is 10 milliseconds.

4. The computer implemented method of claim 1, wherein said decision context data further includes attributes selected from a list consisting of available inventory and origin-destination data.

5. The computer implemented method of claim 1, wherein said entry attributes are selected from a list consisting of customer contexts, including demographics, loyalty, frequency/recency, and preferences; purchase contexts, including time of day, day of week, booking group size, advance purchase aspects; market contexts, including location features, market type, destination; and product contexts, including quality aspects, stayover restrictions.

6. The computer implemented method of claim 1, wherein said first machine learning model is a recurrent neural network.

7. A system to automatically generate an optimized decision distribution vector for a plurality of related, demand-correlated products, which comprises:

a computer system comprising a computer readable storage medium having program instructions embodied therewith, the program instructions executable by the computer to cause the computer to:

receive a data set having a plurality of entries indexed according to said plurality of related, demand-correlated products, with each entry including a plurality of entry attributes;

receive current decision context data for said plurality of products, said decision current context data selected from a list consisting of price data, inventory data, promotion campaign data, and advertisement data;

determine a set of primary entry attributes from among said plurality of entry attributes;

train a first machine learning model based upon said set of primary entry attributes offline or during non-peak times;

responsive to said computer receiving a decision request including a set of attributes that includes an associated set of attributes corresponding to said set of primary entry attributes, score said associated set of attributes corresponding to said set of primary entry attributes with said first machine learning model to generate a baseline purchase propensity;

determine incrementally modified price elasticities for the plurality of entry attributes using the baseline purchase propensity;

train a second machine learning model, based incrementally upon each of said entry attributes to generate incrementally modified own-product and cross-product elasticity data associated therewith;

determine a pricing effectiveness value associated with each of said entry attributes for each of said associated incrementally modified price elasticities;

rank said entry attributes by said calculated pricing effectiveness value;

iteratively add each of said entry attributes in decreasing pricing effectiveness rank order to a set of secondary attributes used with said second machine learning model to calculate said decision distribution vector, until an own-product and cross-product elasticity data computation duration exceeds a selected computation duration threshold, and label each remaining entry attribute as a primary entry attribute and remove each of said entry attributes added to said secondary entry attributes from said set of primary attributes;

responsive to generating said baseline purchase propensity, train the second machine learning model based upon said baseline purchase propensity and said current decision context data, to generate own-product and cross-product elasticity data, the baseline propensity is combined with the current decision context data and the secondary event attributes to generate price elasticity, which indicates a customer sensitivity to prices, the current decision context data including pricing assigned to various products purchased;

generate, using said own-product elasticity data and cross-product elasticity data, a decision distribution vector selected, at least in part, in accordance with said current decision context data for said plurality of related, demand-correlated products, the distribution vector including prices for each of the options a customer chooses to meet travel criteria included in the decision request;

provide via a customer display menu in operative communication with said computer, a set of purchase choices representing a price distribution based, at least in part, on the distribution vector;

responsive to providing the set of purchase choices, receive, an indication of user selection and updating the data set with attributes of the user selection; and responsive to receiving the indication of user selection, add metadata associated with the user selection for use in updated training of the first and second machine learning models.

8. The system of claim 7, wherein said pricing effectiveness is based upon considerations selected from a list consisting of predicted revenue error and revenue lift.

9. The system of claim 7, wherein said selected computation duration threshold is 10 milliseconds.

10. The system of claim 7, wherein said decision context data further includes attributes selected from a list consisting of available inventory and origin-destination data.

11. The system of claim 7, wherein said entry attributes are selected from a list consisting of customer contexts, including demographics, loyalty, frequency/recency, and preferences; purchase contexts, including time of day, day of week, booking group size, advance purchase aspects; market contexts, including location features, market type, destination; and product contexts, including quality aspects, stayover restrictions.

12. The system of claim 7, wherein said first machine learning model is a recurrent neural network.

13. A computer program product to automatically generate an optimized decision distribution vector for a plurality of related, demand-correlated products, the computer program product comprising a computer readable storage medium having program instructions embodied therewith, the program instructions executable by the computer to cause the computer to:

receive, using the computer, a data set having a plurality of entries indexed according to said plurality of related, demand-correlated products, with each entry including a plurality of entry attributes;

receive, using the computer, current decision context data for said plurality of products, said current decision context data selected from a list consisting of price data, inventory data, promotion campaign data, and advertisement data;

determine, using the computer, a set of primary entry attributes from among said plurality of entry attributes;

train, using the computer, a first machine learning model based upon said set of primary entry attributes offline or during non-peak times;

responsive to said computer receiving a decision request including a set of attributes that includes an associated set of attributes corresponding to said set of primary entry attributes, score using the computer, said associated set of attributes corresponding to said set of primary entry attributes with said first machine learning model to generate a baseline purchase propensity;

determine incrementally modified price elasticities for the plurality of entry attributes using the baseline purchase propensity;

train, using the computer, said second machine learning model, based incrementally upon each of said entry attributes to generate incrementally modified own-product elasticity data and cross-product elasticity data associated therewith;

determine, using the computer, a pricing effectiveness value associated with each of said entry attributes for each of said associated incrementally modified price elasticities;

rank, using the computer, said entry attributes by said calculated pricing effectiveness value;

iteratively add, using said computer, each of said entry attributes in decreasing pricing effectiveness rank order to a set of secondary attributes used with said second machine learning model to calculate said decision distribution vector, until an own-product elasticity data and cross-product elasticity data computation duration exceeds a selected computation duration threshold, and label, using said computer, each remaining entry attribute as a primary entry attribute and remove, using the computer, each of said entry attributes added to said secondary entry attributes from said set of primary attributes;

responsive to generating said baseline purchase propensity, train, using the computer, a second machine learning model based upon said baseline purchase propensity and said current decision context data, to generate own-product elasticity data and cross-product elasticity data, with respect to the current decision context data, the baseline propensity is combined with the current decision context data and the secondary event attributes to generate price elasticity, which indicates a customer sensitivity to prices, the decision context data including pricing assigned to various products purchased;

generate, using said computer and said own-product elasticity data and cross-product elasticity data, a decision distribution vector selected, at least in part, in accordance with said current decision context data for said plurality of related, demand-correlated products, the distribution vector including prices for each of the options a customer chooses to meet travel criteria included in the decision request;

provide via a customer display menu in operative communication with said computer, a set of purchase choices representing a price distribution based, at least in part, on the distribution vector;

responsive to providing the set of purchase choices, receive, an indication of user selection and updating the data set with attributes of the user selection; and responsive to receiving the indication of user selection, add metadata associated with the user selection for use in updated training of the first and second machine learning models.

14. The computer program product of claim 13, wherein said first machine learning model is a recurrent neural network.

* * * * *